United States Patent [19]
Yoshino et al.

[11] 4,264,786
[45] Apr. 28, 1981

[54] A.C. SIGNAL CURRENT TRANSMISSION TRUNK CIRCUIT FOR TELEPHONE EXCHANGE SYSTEMS

[75] Inventors: Tetsuo Yoshino; Tsuyotake Sawano, both of Tokyo, Japan

[73] Assignee: Nippon Electric Co., Ltd., Tokyo, Japan

[21] Appl. No.: 7,924

[22] Filed: Jan. 31, 1979

[30] Foreign Application Priority Data

Jan. 31, 1978 [JP] Japan .................. 53/10339

[51] Int. Cl.³ .............. H03K 17/56; H04M 19/02
[52] U.S. Cl. ............... 179/18 HB; 179/18 AH; 179/51 AA; 179/84 A; 307/252 T
[58] Field of Search ....... 179/18 HB, 18 GF, 51 AA, 179/84 A, 17 E, 18 AH; 307/252 G, 252 P, 252 Q, 252 T, 252 W

[56] References Cited

U.S. PATENT DOCUMENTS

| | | | |
|---|---|---|---|
| 3,235,669 | 2/1966 | Lanham | 179/84 A |
| 3,247,327 | 4/1966 | Lanham | 179/84 A |
| 3,536,852 | 10/1970 | Dolarmore | 179/18 HB X |
| 3,808,378 | 4/1974 | Hernandez | 179/84 A |
| 4,021,617 | 5/1977 | Jones, Jr. | 179/17 E |
| 4,082,923 | 4/1978 | Okuhara | 179/18 GF |

OTHER PUBLICATIONS

"A Line Concentrator Using Electronic Crosspoints," by Suzuko et al., International Switching Symposium, Oct. 1976, Kyoto, Japan, 243-1-1 to 243-1-5.

*Primary Examiner*—Thomas W. Brown
*Attorney, Agent, or Firm*—Laff, Whitesell & Rockman

[57] ABSTRACT

An A.C. signalling transmission trunk circuit has a single-polarity drive voltage source for controlling a pair of thyristor-switching circuits which are assigned, respectively, to a subscriber line pair. The voltage source is arranged to supply either a positive or negative half-wave A.C. signal voltage over one side of the subscriber line to one of the thyristor-switching circuits. Another half-wave A.C. drive voltage of the same polarity (but 180 degrees out of phase) is applied over the other side of the subscriber line to the other of the thyristor-switching circuits. The instantaneous potentials on the two sides of the subscriber lines have single polarity—either a positive or a negative potential—while supplying the A.C. signal to the subscriber set.

13 Claims, 15 Drawing Figures

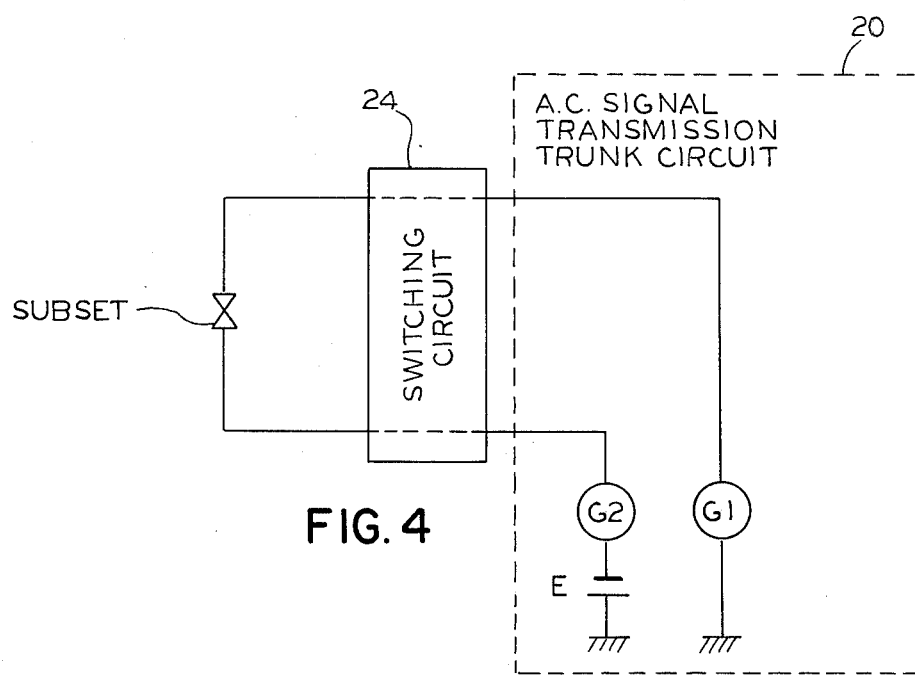
FIG. 3a  FIG. 3b
FIG. 4
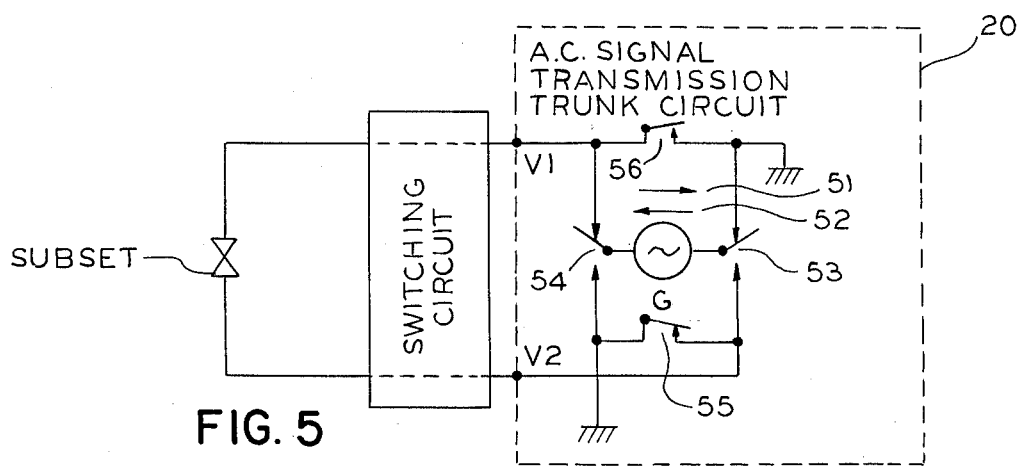
FIG. 5

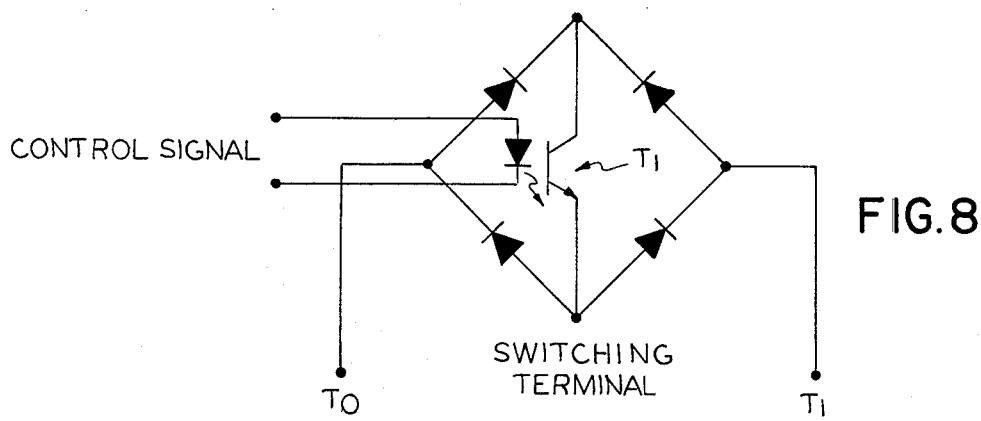
FIG. 8
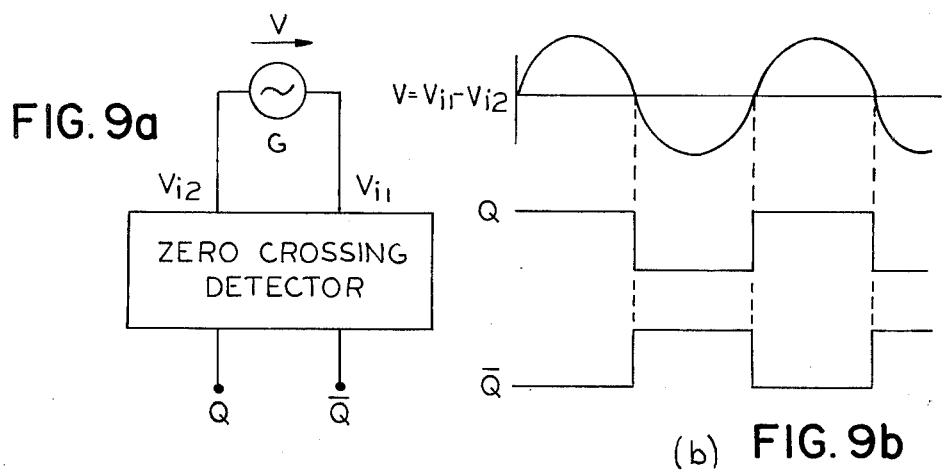
FIG. 9a
FIG. 9b
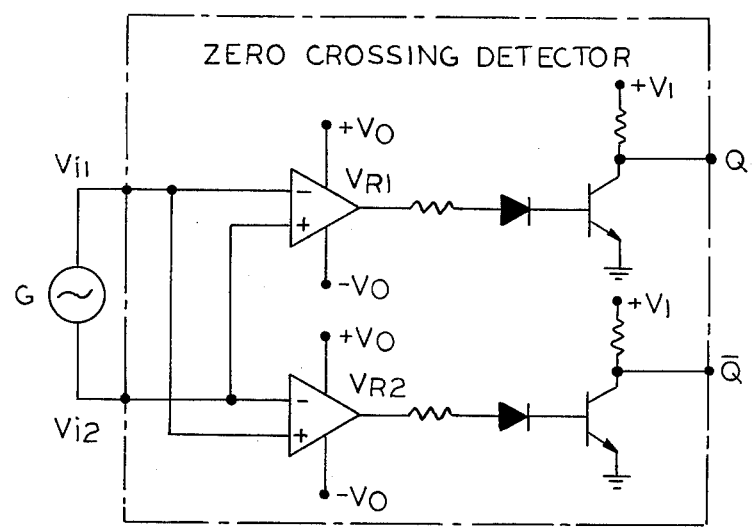
FIG. 10

A.C. SIGNAL CURRENT TRANSMISSION TRUNK CIRCUIT FOR TELEPHONE EXCHANGE SYSTEMS

The invention relates to an A.C. signal transmission trunk circuit for a telephone exchange system and, more particularly, to such a trunk circuit for use in a telephone exchange system having semiconductor speech path switching elements which must always have a minimum maintenance current, when switched on. The A.C. signals include a howler tone and ringing signals for transmission to subscriber lines.

BACKGROUND OF THE INVENTION

A trunk circuit is used in a telephone exchange to superimpose an A.C. voltage on a D.C. voltage. The A.C. voltage is used for signalling and the D.C. voltage is used for controlling the subscriber circuit. Therefore, the potential on the subscriber line must always stay at a positive or a negative polarity potential or alternate between the two, depending on the A.C. and D.C. voltages that are used.

A semiconductor device, such as a thyristor, may be used as a crosspoint or a switching element in the speech path. A characteristic of such a device is that it requires a definite polarity potential relationship and maintenance current, with respect to the subscriber line. More particularly, a thyristor, which requires a self-sustaining gate current for the maintenance of an "ON" state, is easily susceptible to the potential variations which unavoidably occur on the subscriber line circuits because of the capacitive and inductive loads connected thereto, such as the bell coils, which adversely affect the speech path connection.

A proposal has been made to solve such problems by Y. Suzuki et al in an article entitled "A LINE CONCENTRATOR USING ELECTRONIC CROSSPOINTS" published in "The Proceeding of International Switching Symposium '76," Kyoto (October 1976), pp. 243-1-1 to 243-1-5. The proposed approach is based on the selective insertion (for the A.C. signal transmission period) of a resistor across either the subscriber line pair or between an outgoing signal terminal of the pair and either ground or a negative voltage source. The inserted resistor constitutes a stable path for supplying the sustaining gate current of the thyristors, during the period in which the A.C. signal passes through the thyristors. However, such a circuit requires a high D.C. voltage to enable the gate electrodes to drive the thyristors, thus making the telephone exchange system more costly to manufacture, than it otherwise has to be.

Another approach is disclosed in U.S. Pat. No. 3,959,668 which issued to I. Ohhinata et al and is based on a combination of a pair of cathode-gate drive thyristors driven by supplying current and a pair of anode-gate drive thyristors driven by taking out current. These thyristors are arranged in such a manner that at least one of the gate currents flows as long as the A.C. signal passes through the thyristors. However, this requires four drive means for each subscriber line pair, thus increasing the complexity of the speech path switching elements.

SUMMARY OF THE INVENTION

Therefore, an object of the present invention is to provide an A.C. signal transmission trunk circuit for a telephone exchange system having a single-polarity voltage source for supplying a drive circuit for semiconductor speech path crosspoint or switching elements, thereby simplifying the switching system as a whole.

According to the present invention, an A.C. signalling transmission trunk circuit has a single-polarity drive voltage source for controlling a pair of thyristor switching circuits which are assigned, respectively, to a subscriber line pair. The voltage source is arranged to supply either a positive or a negative half-wave A.C. signal voltage to one of the thyristor-switching circuits while supplying another half-wave A.C. drive voltage of the same polarity (but 180 degrees out of phase) to the other of the thyristor-switching circuits. The instantaneous voltage with respect to the ground must not cross the zero level for either a positive or a negative half wave from an A.C. drive voltage source, so that the A.C. signal may reach the subscriber set.

BRIEF DESCRIPTION OF THE DRAWINGS

The invention will now be described in conjunction with the accompanying drawings, in which:

FIGS. 3(a) and 3(b) are waveform diagrams for describing the circuit structure of FIG. 2;

FIG. 4 is a block diagram of a modification of the circuit structure of FIG. 2;

FIG. 5 is a block diagram of another modification of the circuit structure of FIG. 2;

FIG. 8 is a circuit diagram of a bidirectional switch suited for use in the circuit structure of the present invention;

FIGS. 9(a) and 9(b) show the connection and function of zero-cross detection circuits, respectively;

FIG. 10 shows an example of a zero-cross detection circuit;

DESCRIPTION OF THE PREFERRED EMBODIMENTS

Figure 1:
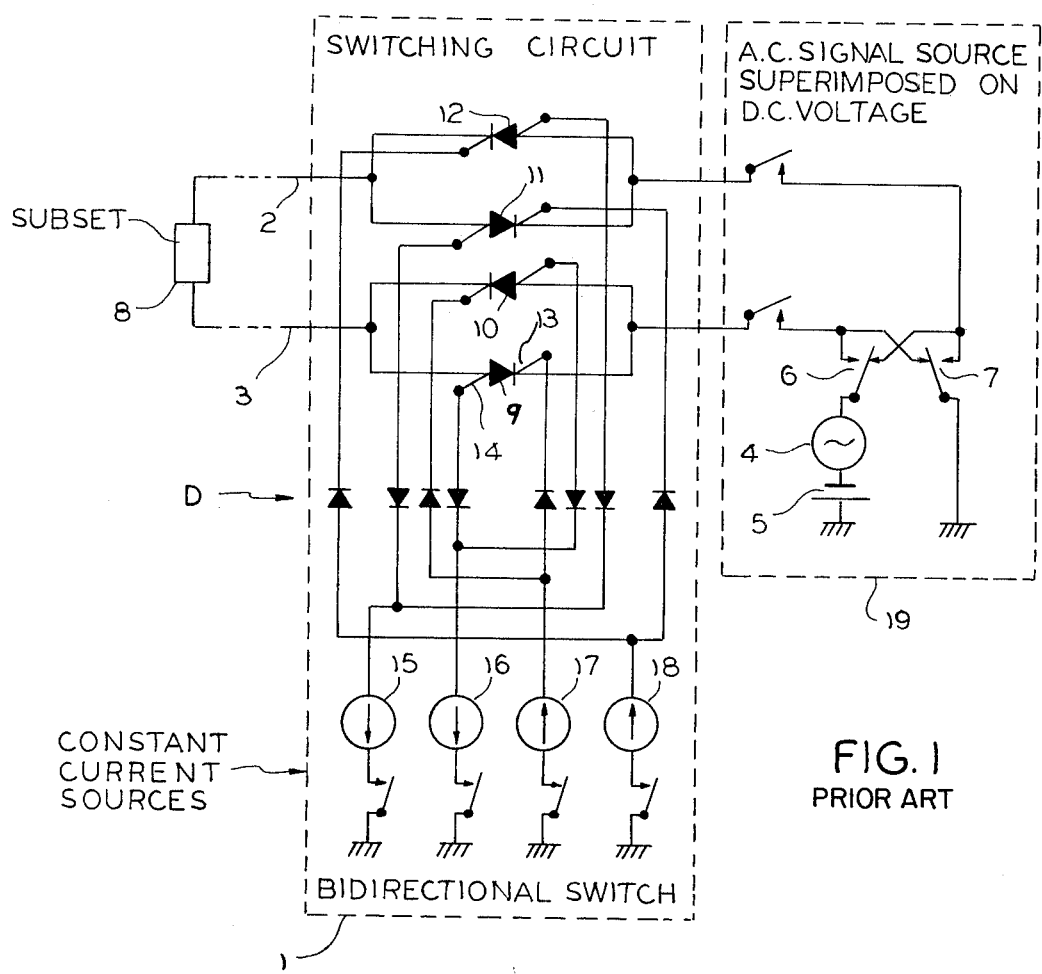
FIG. 1 is a circuit diagram showing a conventional speech path circuit having a semiconductor control circuit.

FIG. 1 shows a conventional circuit for speech path control which includes a D.C. and a superimposed A.C. signal source 19, and a semiconductor, bidirectional switch circuit 1, to which a subscriber set 8 is connected through a pair of subscriber lines 2 and 3. The signal source 19 has an A.C. signal source 4, a D.C. voltage source 5 for the subscriber set control, and a pair of changeover switches 6 and 7 for inverting the polarity of the signal transmitted over the paired subscriber lines 2 and 3 to the subscriber set 8.

The switch circuit 1 has a pair of cathode-gate drive and anode-gate drive thyristors 11 and 12 connected between one of the output wires of the signal source 19 and the subscriber line 2, and another pair of cathode-gate drive and anode-gate drive thyristors 9 and 10 connected between the other of the output wires of the signal source 19 and the subscriber line 3. The gate electrodes of these thyristors 9 to 12 are connected through diodes D to constant current sources 15, 16, 17 and 18, respectively, in paired connection as shown. For further details of the structure and functions of the elements of switch 1, reference may be made to the above-mentioned U.S. Pat. No. 3,959,668.

In the conventional signal source 19, the signal voltage which is applied to one of the paired subscriber lines 2 and 3 is the summation of an A.C. signal from generator 4 and the D.C. voltage of battery 5. The potential applied to the other of the paired subscriber lines is ground, depending on the operational positions of the changeover switches 6 and 7.

When there is a fixed connection between the A.C. signal source 4 and the switch circuit 1, the changeover switches 6 and 7 may be omitted. The switch circuit 1 must be capable of supplying, to lines 2 and 3, all the possible instantaneous demands for positive or negative potential. The paired connections of the thyristors 9 to 12 (with their polarities inverted) are for this purpose. More particularly, for the cathode-gate thyristors to remain conductive in an "ON" state (even when the instantaneous potential is high), maintaining the self-sustaining gate current, the gate voltage should always be higher than a given minimum potential. The same applies to the anode-gate thyristors. As a result, the power supply for the switch circuit must have a relatively high voltage, thus requiring high-performance circuit components and making the whole system more costly to manufacture. The paired thyristor connection as illustrated in FIG. 1 obviates the demand for such a high-voltage source.

However, the double paired connection of thyristors involves the use of four separate constant current sources 15 to 18, thus complicating the switch circuit as a whole.

Figure 2:
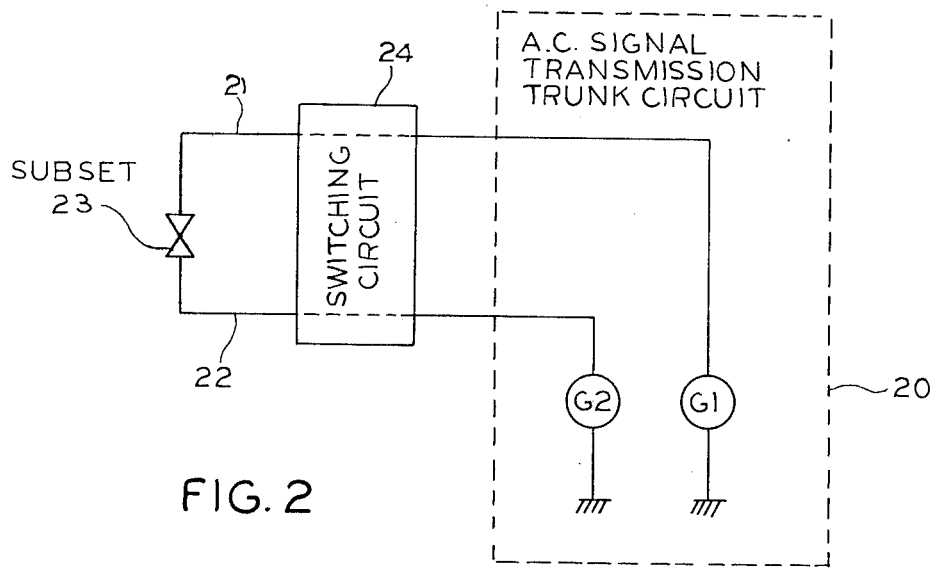
FIG. 2 is a block diagram illustrating a fundamental circuit structure of the present invention.

The fundamental circuit of the present invention is shown in FIG. 2 together with its waveforms shown in FIGS. 3(a) and 3(b). The A.C. signal transmission trunk circuit 20 has two A.C. voltage generators or sources $G_1$ and $G_2$ connected to a subscriber set 23 via first and second subscriber lines 21 and 22 and the semiconductor switching circuit 24. The A.C. voltages, supplied to the lines 21 and 22, are single-polarity half waves which are 180° out of phase with each other, as shown in FIG. 3(a) or 3(b). For example, when a first positive half wave is supplied from the A.C. voltage generator or source $G_1$, as shown in FIG. 3a, a current flows toward the A.C. voltage generator or source $G_2$ through switching circuit 24, first subscriber line 21, subscriber set 23, second subscriber line 22, and switching circuit 24, respectively. Then, the voltage polarity at the first subscriber line 21 side of the subscriber set 23 is positive, and at the second subscriber line 22 side of the subscriber set 23 is ground.

The following positive half wave, which is 180° out of phase, is produced by the A.C. voltage generator or source $G_2$ as shown in FIG. 3a. At this time, the current flows toward the A.C. voltage generator or source $G_1$ through switching circuit 24, second subscriber line 22, subscriber set 23, first subscriber line 21 and switching circuit 24, respectively. In this case, the voltage polarity supplied to the subscriber set 23 is reversed. Then, the voltage polarity at the subscriber line 21 side is ground, and at the subscriber line 22 side is positive. Thus, a full wave A.C. signal voltage can be supplied to the subscriber set 23. It is to be noted here that the positive and negative half-wave A.C. voltages (FIG. 3) have equal amplitudes in this embodiment.

In a modification (FIG. 4) of the A.C. signal transmission trunk circuit 20, a D.C. bias voltage source E is connected in series with the A.C. voltage generator or source $G_2$. The D.C. voltage at the source E is such that the half-wave A.C. voltages, when superimposed on a full wave, have a single polarity, which may be either positive or negative.

A further modification (FIG. 5) employs a single A.C. voltage generator or source G coupled with switches 53, 54, 55 and 56 so that the source G is equivalent to a pair of half-wave A.C. voltage sources which supply the A.C. current in the directions of arrows 51 and 52, respectively.

Figure 6:
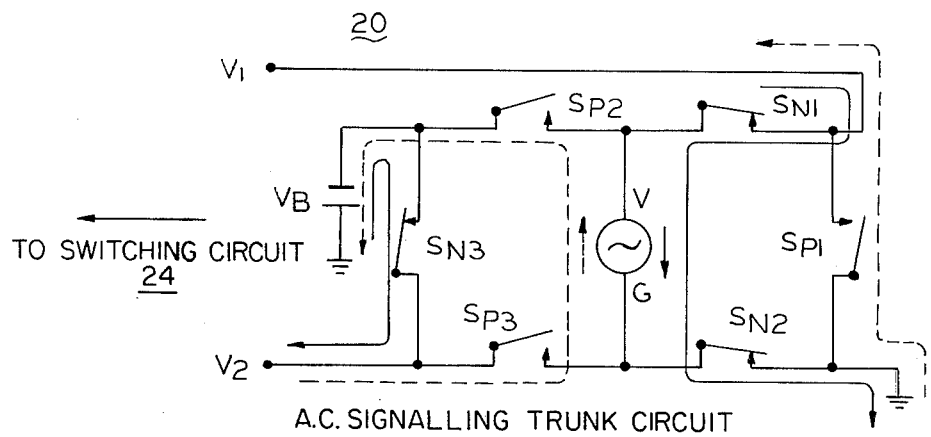
FIG. 6 is a circuit diagram of still another modification of the circuit structure of FIG. 2.
Figure 7:
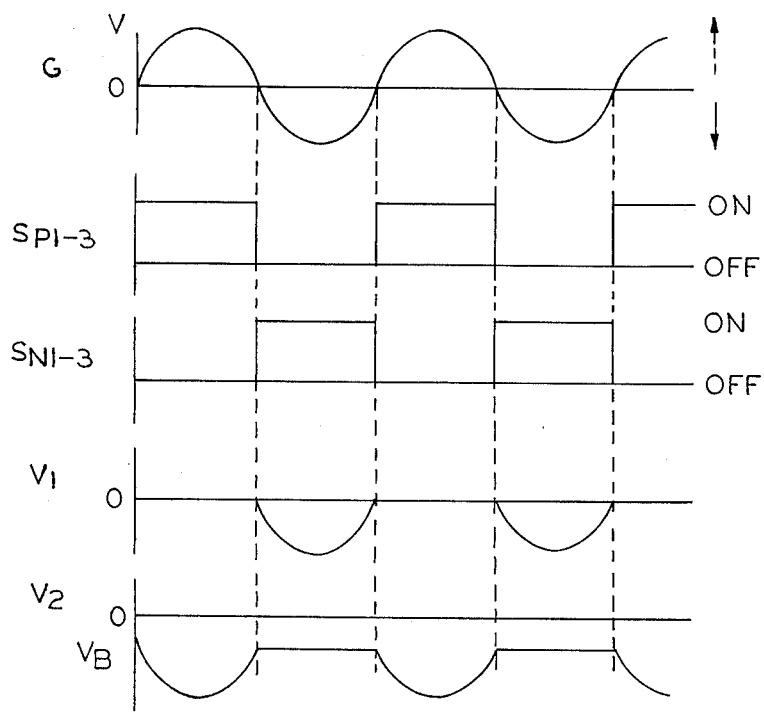
FIG. 7 is a waveform diagram for describing the circuit of FIG. 6.

FIG. 6 shows another modification of a trunk circuit using a single A.C. voltage source G which is equivalent to two half-wave voltage sources. The relationship between the voltages on the subscriber lines and the ON-OFF states of the respective switches are as shown in the waveform diagram in FIG. 7. When the output voltage V of the A.C. voltage generator or source G is positive, switches $S_{p1}$ to $S_{p1}$ turned ON, while switches $S_{N1}$ to $S_{N3}$ are turned OFF. Then, the current flowing through the trunk circuit follows the path represented by the dashed arrow lines, so that a terminal $V_1$ connected to a switching circuit 24 is at the ground potential, while a terminal $V_2$ connected also to the switching circuit 24 receives a bias voltage from battery $V_B$, which voltage is superimposed on a half-wave A.C. voltage. Subsequently, when the A.C. output voltage V of A.C. generator G becomes negative, the switches $S_{p1}$ to $S_{p3}$ are turned OFF while the switches $S_{N1}$ to $S_{N3}$ are turned ON, to enable a current to flow, as represented by solid arrow lines. As described above, the A.C. current is transmitted to the switching circuit 24 while maintaining the subscriber lines at a negative potential by turning ON and OFF the switches $S_{p1}$ to $S_{p3}$ and $S_{N1}$ to $S_{N3}$, in response to the polarity of the output voltage V of the A.C. voltage source G.

It is to be noted that the subscriber lines can be maintained at a positive potential, during the transmission of the A.C. current, by reversing the ON/OFF phases of the switches $S_{p1}$ to $S_{p3}$ and and the switches $S_{N1}$ to $S_{N3}$.

Figure 11:
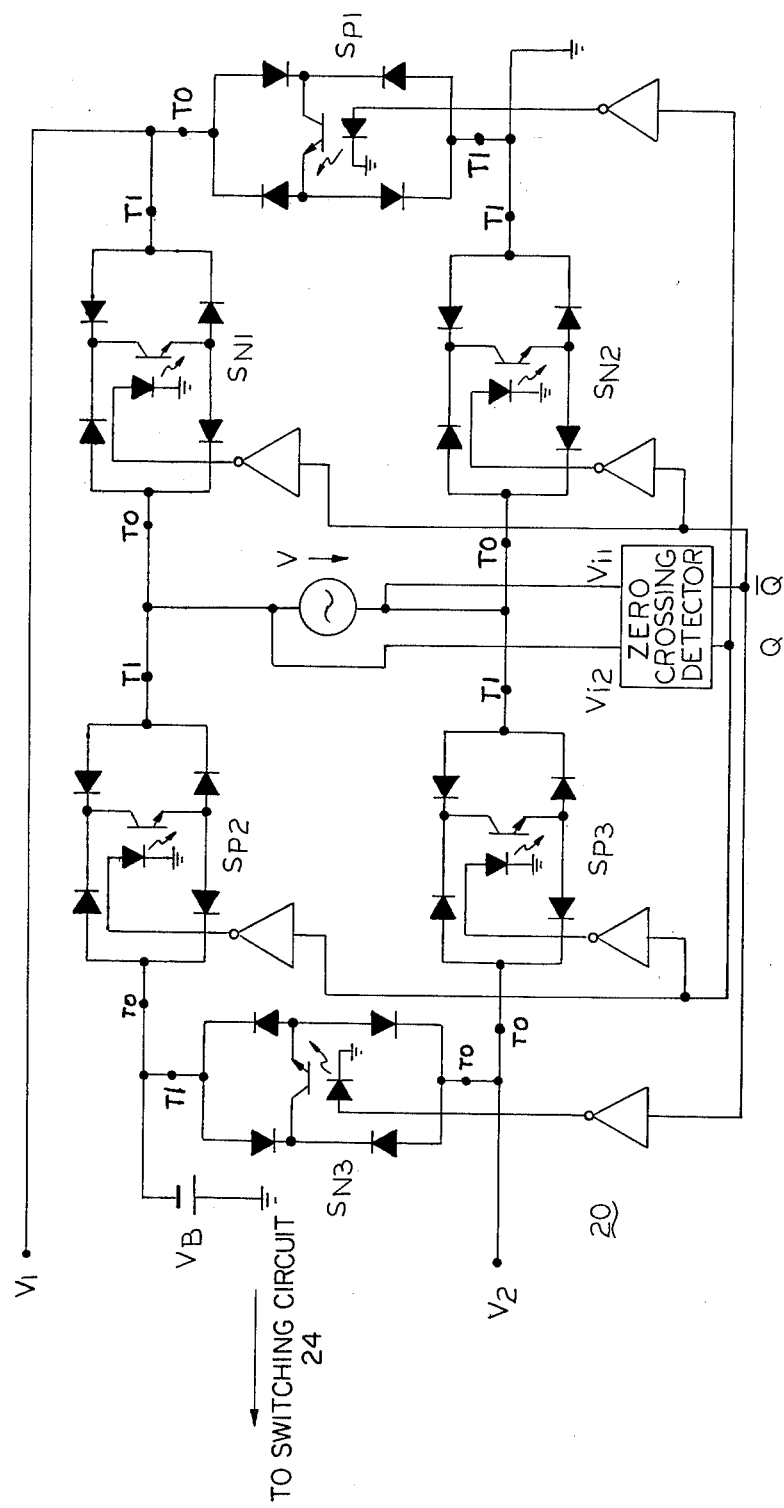
FIG. 11 is a circuit diagram of a preferred embodiment of the present invention.
Figure 12:
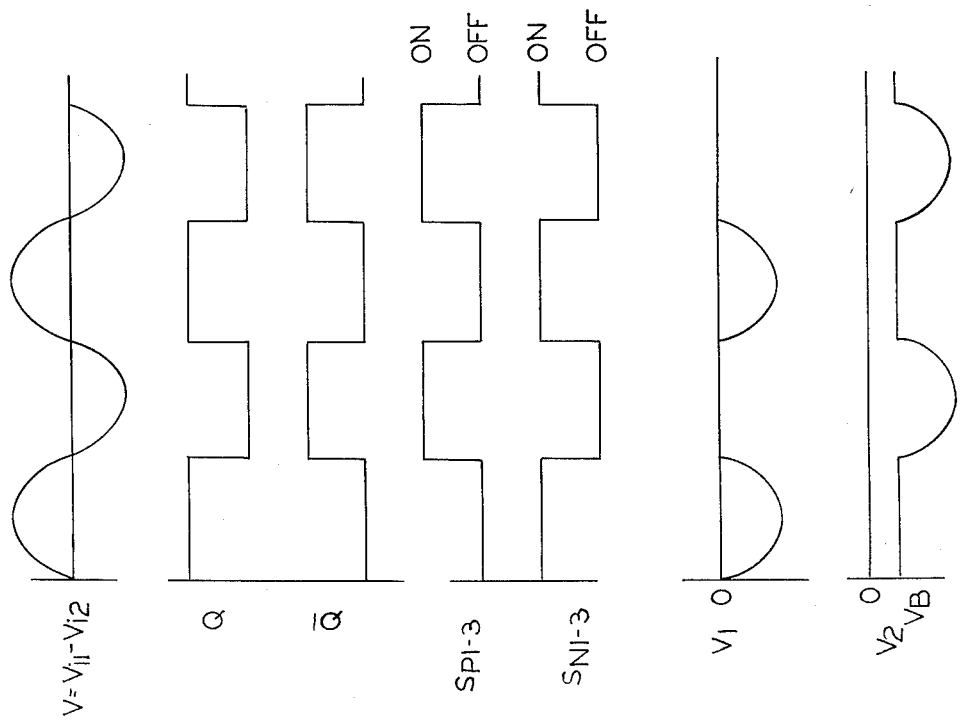
FIG. 12 shows waveforms for describing the operation of the circuit of FIG. 11.

Fig. 11 shows a circuit diagram of a trunk constructed by a use of semiconductor devices. The operation of this circuit is similar to that of FIG. 6. The switches $S_{P1}$ to $S_{p3}$ and $S_{N1}$ to $S_{N3}$ in FIG. 6 corresponded to those having the same label in FIG. 11, respectively. The control sequence mentioned above is realized by a zero-crossing detector in FIG. 11. The output signals Q and Q of the zero-crossing detector circuit, the ON-OFF timing of the switches $S_{P1}$ to $S_{P3}$ and $S_{N1}$ to $S_{N3}$, and the waveforms of the potentials appearing at the output terminals during the circuit operation are shown in FIG. 12.

Next, a description will be made of the circuit structure of the switches $Sp_1$ to $Sp_3$ and $S_{N1}$ to $S_{N3}$ shown in FIG. 6. These switches must be bidirectional to ensure proper operation, regardless of the phase advance or phase lag of the current responsive to the capacitive and inductive components of the subscriber lines. For this purpose, the switch of FIG. 8 may be used for any individual one of the switches $S_{P1}$ to $S_{P3}$ and $S_{N1}$ to $S_{N3}$. The bidirectional switch shown in FIG. 8 has an optically coupled switching transistor T in a bridge connection of diodes. This bidirectional switch responds to a control signal applied to the switching transistor T, turning ON the connection between terminals $T_0$ and $T_1$. It is to be noted that the optically coupled switching transistor T may be replaced by an NPN transistor that is base-driven by a constant-current source for a high power operation.

It should also be noted that, in order to make this bidirectional switch operate as in the circuit shown in FIG. 6, it must be controlled responsive to the phase of the A.C. voltage source. This control signal can be obtained by means of a zero-crossing detector circuit as shown in FIGS. 9 and 10. The principal of the zero-crossing detector circuit is shown in FIG. 9(a). The waveforms appearing at the respective points in FIG. 9(a) are illustrated in FIG. 9(b). The output voltage V of the A.C. voltage source G is inputted to input terminals $V_{i1}$ and $V_{i2}$ to compare the two input terminal potentials and to provide output signals Q and $\overline{Q}$.

A more detailed circuit diagram of the zero-crossing detector circuit is illustrated in FIG. 10. This circuit comprises two voltage comparators $VR_1$ and $VR_2$. A negative input of the voltage comparator $VR_1$ is connected to the terminal $V_{i1}$, and a positive input is connected to the terminal $V_{i2}$. A negative input of the voltage comparator $VR_2$ is connected to the terminal $V_{i2}$, and a positive terminal is connected to the terminal $V_{i1}$. When the output voltage of the A.C. voltage source G is applied between the input terminals $V_{i1}$ and $V_{i2}$, the input terminal potentials are compared with each other in the voltage comparators $VR_1$ and $VR_2$, respectively. It is here assumed that the potentials at the input terminals $V_{i1}$ and $V_{i2}$, respectively, are represented by the same reference characters $V_{i1}$ and $V_{i2}$. When the potential difference $V_{i1}-V_{i2}$ is positive, a higher level output is derived at the terminal Q, but when the potential difference $V_{i1}-V_{i2}$ is negative, a higher level output is derived at the terminal $\overline{Q}$.

Figure 13:
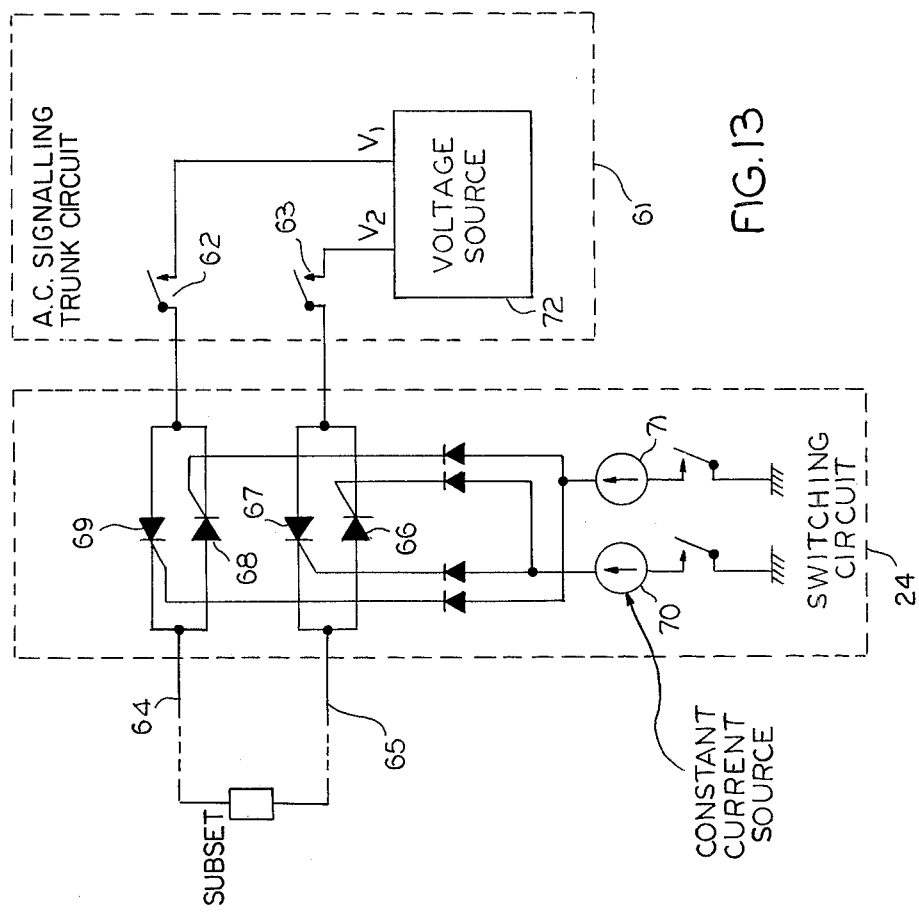
FIG. 13 is a circuit diagram showing the embodiment as connected to the speech path circuit.

FIG. 13 shows the trunk circuit of the present invention as being connected to the switching circuit 24. In this figure, a voltage source 72 in an A.C. signal transmitting trunk 61 is a half-wave A.C. voltage source, according to the present invention illustrated in FIG. 11, which generates only negative potentials. Reference numerals 62 and 63 designate self-sustaining current cutoff switches. Only negative potentials are applied to subscriber lines 64 and 65. The conventional cathode-gate thyristors may be used as the thyristors 66 to 69 which constitute a bidirectional speech pass switch. The thyristors 66 to 69 can be controlled by a pair of single-polarity constant-current sources 70 and 71. As will be apparent, the present invention helps simplify the switching circuit 24 as compared with the complexity of switching circuits in conventional systems.

As described above, the characteristic feature of the present invention in that an A.C. signal voltage can be transmitted to paired subscriber lines with a simplified switch circuit. Owing to such feature of the invention, the control signal source for the gate electrodes of the semiconductor thyristors can be simplified, tolerating the use of lower quality semiconductor thyristors having a lower breakdown voltage. Furthermore, the present invention helps facilitate the manufacture of the gate control signal source for the thyristors, in a high-density integrated circuit form. The anode-gate drive thyristors require NPN transistors for the gate drive, which require high breakdown voltage. However, they can be replaced by cathode-gate drive thyristors, according to the present invention.

Those who are skilled in the art will readily perceive how to modify the system. Therefore, the appended claims are to be construed to cover all equivalent structures which fall within the true scope and spirit of the invention.

What is claimed is:

1. An A.C. signalling transmission trunk circuit for transmitting A.C. signals to a pair of subscriber lines in telephone exchange systems, said trunk circuit comprising:
   (a) means for generating A.C. signals;
   (b) bidirectional switching means for selectively connecting said A.C. signal generating means to the subscriber lines and ground;
   (c) zero-crossing detector means for detecting zero voltage points of said A.C. signals; and
   (d) means responsive to said zero-crossing detector means for selectively operating said bidirectional switching means while the output at a first terminal of said A.C. signal generating means has a first single-polarity half-wave A.C. signal, said zero-crossing detector means controlling said bidirectional switching means for connecting a first subscriber line to said first terminal of said A.C. signal generating means, and for connecting a second subscriber line and a second terminal of said A.C. signal generating means to ground, and while the output at said first terminal of said A.C. signal generating means is a second single-polarity half-wave A.C. signal, said zero-crossing detector means controlling said bidirectional switching means for connecting said first subscriber line and said first terminal of said A.C. signal generating means to the ground, and for connecting said second subscriber line to said second terminal of said A.C. signal generating means.

2. The A.C. signalling trunk circuit of claim 1 and D.C. power supply means connected between ground and said bidirectional switching means.

3. The A.C. signalling trunk circuit of claim 1 wherein first and second A.C. signals are supplied from two separate A.C. signal generating means.

4. The A.C. signalling trunk circuit of claim 3 and D.C. voltage source means in series with one of said A.C. signal generating means for superimposing a D.C. bias on at least one of said A.C. signals.

5. The A.C. signalling trunk circuit of claim 1 wherein first and second A.C. signals are supplied from a single A.C. signal generating means, and changeover contact means are provided for selectively changing the polarity of said A.C. signal generating means applied to a pair of subscriber lines.

6. The A.C. signalling trunk circuit of claim 1 wherein said bidirectional switching means comprises a diode bridge with an optically coupled switching transistor coupled across said diode bridge.

7. The A.C. signalling trunk circuit of claim 18 wherein said bidirectional switching means passes A.C. signals while maintaining a D.C. bias in a speech path, said bidirectional switching means comprising a diode bridge having two diagonal dimensions, optically coupled transistor switch means connected across one diagonal of said bridge and means including the other diagonal of said bridge for selectively completing at least a part of a speech path.

8. The A.C. signalling trunk circuit of claim 7 and means responsive to said zero-crossing detector means for selectively operating said optically coupled transistor means.

9. The A.C. signalling trunk circuit of claim 2 wherein there are a plurality of said bidirectional switching means connected in a polarity changeover switching configuration, said bidirectional switching means passing A.C. signals while maintaining a D.C. bias in a speech path, each of said bidirectional switching means comprising a diode bridge having two diagonal dimensions, optically coupled transistor switch means connected across one diagonal of said bridge, means including the other diagonal of said bridge for selectively completing at least a part of a speech path, and means responsive to said zero-crossing detector means for selectively operating said plurality of bidirectional switching means to changeover polarity on said speech path responsive to the polarity of said A.C. signals.

10. The A.C. signalling trunk circuit of claim 9, said bidirectional switching means connected in said changeover switching configuration being connected between said D.C. power supply and said subscriber line whereby a stable D.C. bias is maintained on said line regardless of the A.C. signal being applied to the line.

11. The A.C. signalling trunk circuit of claim 2 wherein there are at least two of said bidirectional switching means individually associated with a pair of subscriber lines, respectively, said bidirectional switching means passing A.C. signals while maintaining a D.C. bias in a speech path, each of said bidirectional switching means comprising a diode bridge having two diagonal dimensions, optically coupled transistor switch means connected across one diagonal of said bridge, means including the other diagonal of said bridge for selectively completing at least a part of a speech path, means responsive to said zero-crossing detector means for supplying one polarity of said A.C. signals in a first-phased relationship to one of said two bidirectional switching means, and means responsive to said zero-crossing detector means for supplying to the other of said two bidirectional switching means said A.C. signals in said one polarity and 180 degrees displaced from said first-phased relationship.

12. The A.C. signalling trunk circuit of claim 1 and a speech path comprising said pair of subscriber lines extending from said A.C. signalling transmission trunk circuit to a telephone subscriber station, said bidirectional switching means comprising a pair of oppositely poled, parallel, electronic switches interposed in each of said lines between said subscriber station and said A.C. signal transmission trunk circuit, and a single constant current source means individually associated with each of said lines for supplying both of the oppositely poled, electronic switches interposed in that line.

13. The A.C. signalling trunk circuit of claim 12 wherein said A.C. signalling transmission trunk circuit comprises means for supplying over said lines a stable D.C. bias current for sustaining and maintaining switched-on conditions of said electronic switches, and means for superimposing said A.C. signal on said D.C. bias without interfering with said maintenance of said sustaining current.

* * * * *

UNITED STATES PATENT AND TRADEMARK OFFICE
CERTIFICATE OF CORRECTION

PATENT NO. : 4,264,786
DATED : April 28, 1981
INVENTOR(S) : YOSHINO, et al.

It is certified that error appears in the above—identified patent and that said Letters Patent is hereby corrected as shown below:

Col. 4, Line 54, after "Q and", "Q" should be --$\bar{Q}$--;

Claim 7, Line 1, "18" should be --2--.

Signed and Sealed this

First Day of December 1981

{SEAL}

Attest:

Attesting Officer

GERALD J. MOSSINGHOFF

Commissioner of Patents and Trademarks